(12) United States Patent
Klein et al.

(10) Patent No.: US 8,051,092 B2
(45) Date of Patent: Nov. 1, 2011

(54) FINALIZE SEQUENCING FOR OBJECTS

(75) Inventors: Udo Klein, Pfinztal (DE); Martin Hartig, Speyer (DE); Stefan Rau, Dielhiem (DE)

(73) Assignee: SAP AG, Walldorf (DE)

( * ) Notice: Subject to any disclaimer, the term of this patent is extended or adjusted under 35 U.S.C. 154(b) by 432 days.

(21) Appl. No.: 11/593,969

(22) Filed: Nov. 6, 2006

(65) Prior Publication Data

US 2008/0109436 A1 May 8, 2008

(51) Int. Cl.
*G06F 7/00* (2006.01)
*G06F 17/30* (2006.01)

(52) U.S. Cl. ......... 707/769; 707/752; 707/802; 707/796
(58) Field of Classification Search ................... 707/1–7, 707/999.1–999.7, 769, 752, 802
See application file for complete search history.

(56) References Cited

U.S. PATENT DOCUMENTS

| | | | |
|---|---|---|---|
| 2005/0021713 A1* | 1/2005 | Dugan et al. | 709/223 |
| 2005/0071342 A1* | 3/2005 | Calusinski | 707/100 |
| 2007/0067254 A1* | 3/2007 | Chen et al. | 707/1 |
| 2007/0118741 A1* | 5/2007 | Ho et al. | 713/159 |
| 2008/0065443 A1* | 3/2008 | Gorur et al. | 705/7 |

* cited by examiner

*Primary Examiner* — Apu Mofiz
*Assistant Examiner* — Mohammad Rahman
(74) *Attorney, Agent, or Firm* — Mintz, Levin, Cohn, Ferris, Glovsky & Popeo, P.C.

(57) ABSTRACT

Systems, methods and apparatus, including computer program products, are provided for saving a plurality of objects to persistent storage as part of a finalize sequence. In one implementation, a computer-implemented method may include, receiving a request to instantiate a plurality of objects; sorting the plurality of objects based on a priority assigned to each of the plurality of objects before the request to instantiate the objects is received; and saving in sequence the sorted plurality of objects to the persistent storage.

18 Claims, 3 Drawing Sheets

FINALIZE SEQUENCING FOR OBJECTS

BACKGROUND

I. Field

This application relates to data processing and, more particularly, to saving objects to a database as part of a finalize sequence.

II. Background and Material Information

In a client-services architecture, a client system, such as a computer, may call an application, such as a service or web service, at a server to interact with the application through the Internet or an intranet. A service, such as a web service, is an application (or program) that makes itself available over the Internet or an intranet, uses standardized messaging, such as XML (extensible Markup Language) and Simple Object Access Protocol (SOAP), and uses some type of location mechanism, such as UDDI (Universal Description, Discovery, and Integration), to locate the service and its public Application Program Interface (API).

To call a service through the Internet or intranet, the client system makes a call though an API, which defines the way the client communicates with the service. The service instantiates objects, such as business objects, in response to the API call. As used herein, the term "instantiate" means, in an object oriented programming environment, producing an object of a particular class and, more generally, includes deploying, customizing, running and/or executing an application. As used herein, an "object" means a software bundle of variables (e.g., data) and related methods. For example, in object-oriented programming, an object is a concrete realization (instance) of a class that consists of data and the methods associated with that data. The phrase "business object" refers to a software bundle of data and related methods that can be used for describing a business process (or task).

An example of a service is a "catalog" service, which can be called through the Internet by a client system. The catalog service may allow a user at a client system to view and purchase products. FIG. 3 depicts some of the business objects that may be associated with the catalog service. The business objects may, for example, correspond to data listing each product (business object 402), product descriptions 404, available quantity 406 (e.g., quantity of products available in stock), and quantity ordered 408. When a client system calls the catalog service, the catalog service instantiates business objects 402-408, allowing objects 402-408 to retrieve from a database data and method associated with those objects. The retrieved data may then be buffered for the transaction with the client system. At some point (e.g., during or after the transaction), the business objects would be saved in a database for persistent storage. This allows any changes to be "distributed" so that other services and/or business objects can access any changes associated with the business object.

Before a business object is saved to persistent storage and thus distributed, a finalize sequence may be performed. The finalize sequence may constitute a sequence of one or more steps performed to ensure that the proper data (or information) is saved to persistent storage. For example, when a finalize sequence is triggered, a business object may be placed in a checked mode, which limits access to the business object to read only while saves of business objects 402-408 to persistent storage are performed. The business object may then be recomputed before a save to account for any changes caused by other business objects that may have written to the business object. Next, the finalize sequence may include a "do save" mode which saves the business objects (e.g., the data and methods of the business object) to persistent storage.

When a business object writes to another business object, the sequencing of the saves to persistent storage may influence whether the saves associated with other business objects are performed correctly, e.g., whether the correct data is being saved. Specifically, if business object 402 writes to business object 406 and business object 408, while business object 406 writes to business object 408, the sequencing of any saves to persistent storage during the finalize sequence may not accurately record the true state of the data at business object 408 since two different business objects (namely 402 and 406) have written to (and thus changed) business object 408. The above example illustrates that there are cross dependencies between business objects that affect how business objects should be saved to a persistent storage mechanism, such as a database.

SUMMARY

This application describes systems, methods, and apparatus, including computer program products, for saving objects to a database.

In one aspect of the application, there is provided a method for saving to persistent storage as part of a finalize sequence. The method may include receiving a request to instantiate a plurality of objects; sorting the plurality of objects based on a priority assigned to each of the plurality of objects before the request to instantiate the objects is received; and saving in sequence the sorted plurality of objects to the persistent storage. Implementations may include one or more of the following features: receiving, at a server, the request to instantiate business objects, the business objects each designed to include the priority for finalizing the business object; using, as the priority, an alpha-numeric value in a range of values; sorting the plurality of business objects by ranking the business objects using the priority assigned to each of the business objects; saving a business object having a higher ranking before another object having a lower ranking, the lower ranking business object being dependent on the higher ranking business object; sorting each of the plurality of business objects based on the priority and a time of creation associated the business object; sorting each of the plurality of business objects based on the priority, a time of creation, and a business object name; and using as a sort criteria, a relative position of a business object in a layered software hierarchy.

It is to be understood that both the foregoing general description and the following detailed description are exemplary and explanatory only. Further features and/or variations may be provided in addition to those set forth herein.

DESCRIPTION OF THE DRAWINGS

These and other aspects of the application will be described in detail with reference to the following drawings.

DETAILED DESCRIPTION

The implementations set forth in the following description do not represent all implementations consistent with the subject matter described herein. Instead, they are merely some examples consistent with certain aspects related to the described subject matter. Wherever possible, the same reference numbers will be used throughout the drawings to refer to the same or like parts.

In one implementation, there is provided systems, methods, and apparatus, such as a computer readable medium, for saving objects to persistent storage as part of a finalize sequence. For example, a client system may call a server system to execute a service at the server. The request may instantiate business objects associated with the service. At some point, data associated with the business objects may need to be saved to the database—distributing any changes to allow other services and business objects to access the changes. The finalize sequence may be triggered by a save called by an application.

Figure 3:
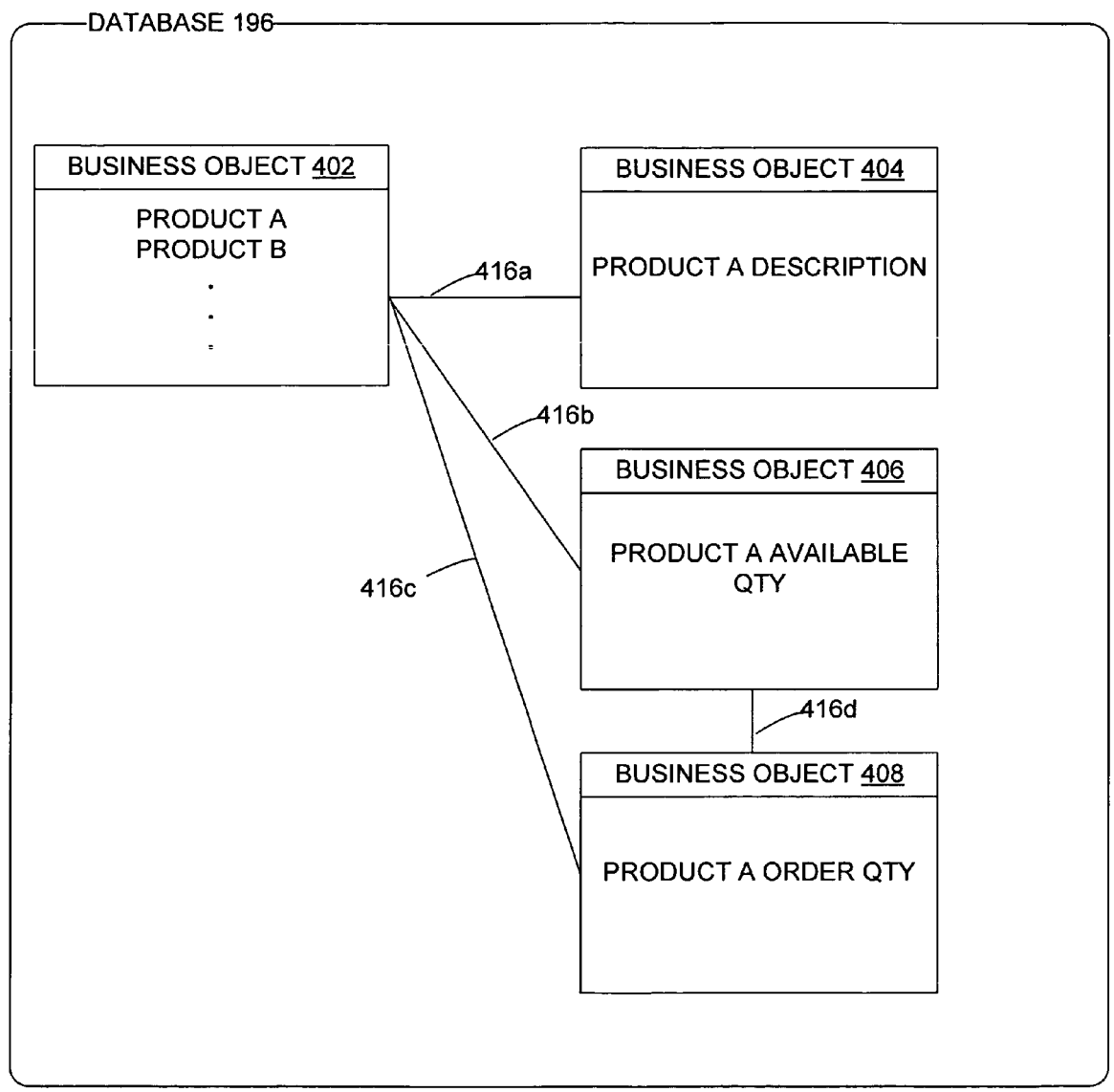
FIG. 3 illustrates a block diagram of exemplary business objects.

Before implementing the save, the server may sort the business objects based on a priority assigned to each of the plurality of business objects. In some implementations, the priority may be assigned to each business object before the business object is instantiated, such as when the business object is designed, and the priorities may be assigned so that a business object that depends on another business object is assigned a lower assigned priority. For example, in FIG. 3, business object 408 would be assigned a lower priority than business objects 402 and 406. The server may then sort based on priority and save each of the sorted business objects in sequence based on the priority, so that, in this example, business object 408 is finalized (and thus saved) after business objects 402 and 406. Accordingly, the use of the predetermined priority may provide a mechanism to save business objects, so that conflicts caused by cross dependencies between business objects are minimized.

By way of another example, suppose there are three business objects corresponding to "BusinessPartner," "Employment," and "WorkAgreement." The BusinessPartner must have a valid ID before Employment and WorkAgreement can be "finalized." The WorkAgreement refers to the Employment as well. Since BusinessPartner does not depend on Employment and WorkAgreement, BusinessPartner would have a higher priority (e.g., "1") and thus finalized first. Since Employment only depends on the work ID provided by the BusinessPartner, Employment would have a priority of "2" and thus finalized after the BusinessPartner. Since the WorkAgreement depends on the other two objects, WorkAgreement would have the lowest priority (e.g., "3") and thus finalized last.

Figure 1:
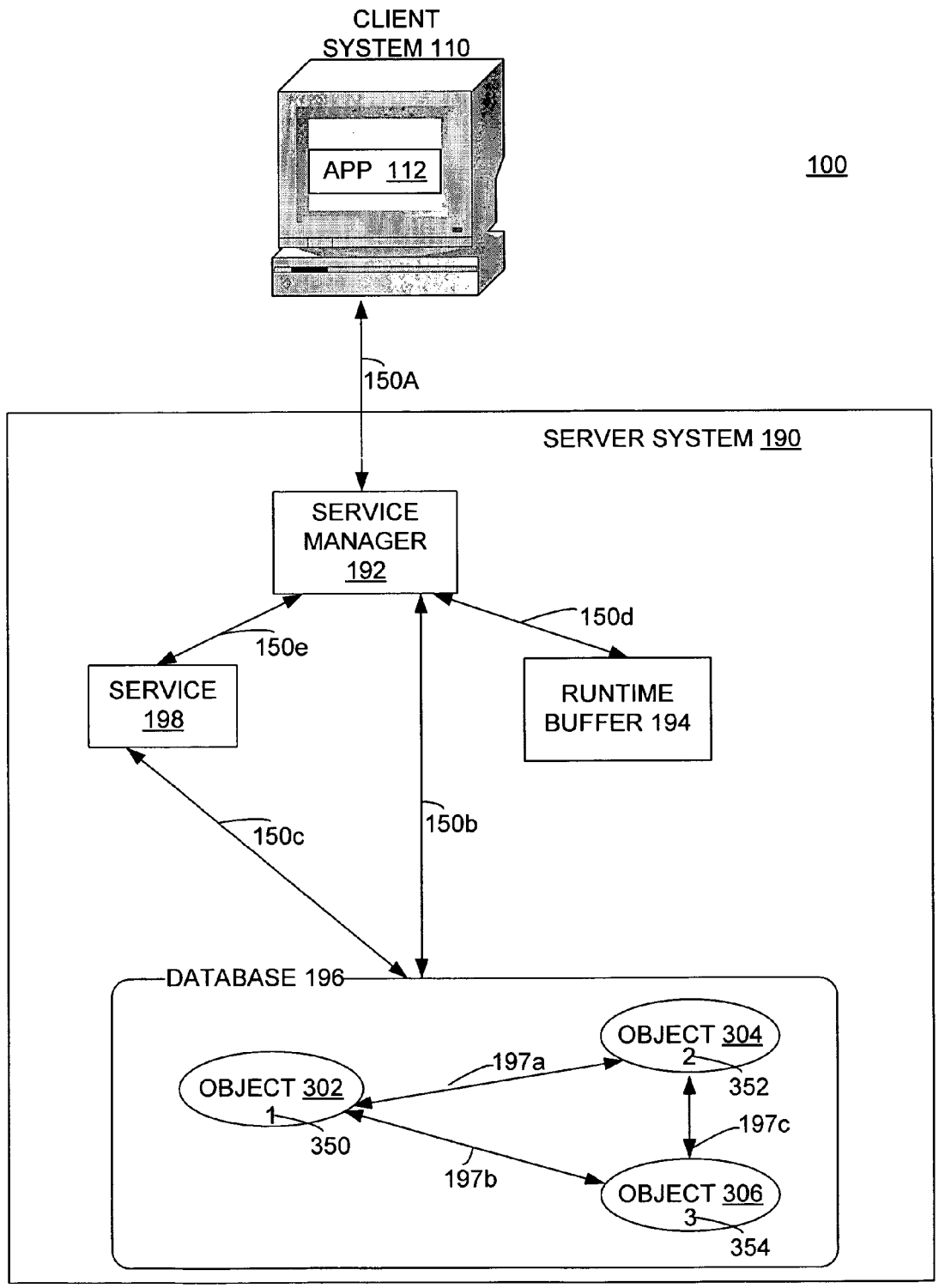
FIG. 1 illustrates a block diagram of an exemplary system environment.

FIG. 1 illustrates a block diagram of an exemplary system environment 100. FIG. 1 includes a client system 110 and a server system 190. Client system 110 may be implemented as a processor, such as a computer, and may also include applications, such as application 112. Application 112 may be implemented as a program designed to perform a specific function or task for a user or another application (also referred to as an application program). Examples of functions that may be performed by application 112 include word processing, communicating, managing databases, browsing, presenting information, and interfacing to other applications or systems.

In some implementations, application 112 includes a user interface to provide an interface to a user, so that the user can interact with other applications, such as service 198. Moreover, the user interface may be provided by a browser that presents content from a service. The user interface may be implemented using Web Dynpro technology (commercially available from SAP AG, Walldorf, Germany).

Client system 110 connects to server system 190 through network connection 150a. A network connection, such as network connection 150a, may include may include, alone or in any suitable combination, a telephony-based network, a local area network (LAN), a wide area network (WAN), a dedicated intranet, wireless LAN, the Internet, a wireless network, a bus, or any other any communication mechanisms. Further, any suitable combination of wired and/or wireless components and systems may be used to provide network connection 150a. Moreover, network connection 150a may be embodied using bi-directional or unidirectional communication links. Further, network connection 150a may include additional protocols, such as Transmission Control Protocol/Internet Protocol (TCP/IP), Hyper Text Transfer Protocol (HTTP), Simple Object Access Protocol (SOAP), Remote Procedure Call (RPC), and the like.

Server system 190 may be implemented as a processor, such as a computer. Server system 190 may include a service manager 192, service 198, a runtime buffer 194, and a repository (or database) 196 for providing a persistent storage mechanism to store business objects 302-306, and network connections 150b-e. Although FIG. 1 depicts business objects 302-306, other objects may be used.

When the API of service manager 192 is called by application 112, an instance of the service manager 192 is created at server system 190. Service manager 192 may then instantiate service 198, which in turn may instantiate business objects 302-306. For example, a user of application 112 may access service 198 to access purchase order data, with the purchase orders and related methods corresponding to business objects 302-206.

In some implementations, service manager 192 may include a message handler for handling messages to and from service manager 192 and service 198; a change handler for handling changes, such as changes that occur when a user at application 112 makes a change, such as a button click, that affects service 198 or the corresponding business objects 302-306; a controller controlling dynamic properties of the instance (e.g., read-only, invisible, and the like) of the business objects; and a stack for storing changes associated with the change handler in a last in, first out manner.

When a business object is instantiated at runtime, it may be stored in a buffer, such as runtime buffer 194. For example, create, update, delete, and execute are all operations that may be performed on data associated with a business object. These operations may be performed to business object data while it is stored in runtime buffer 194 instead of storing data directly on the database 196. At some point, the data associated with the business object may be stored in database 196 as part of a finalize sequence to distribute any changes to other business objects and/or services.

Business objects 302-306 may be implemented as objects or as any other suitable data structure. Moreover, a business object may be associated with another business object using an identifier, link, or the like. For example, FIG. 1 depicts associations 197a-c. In one implementation, business objects 302-306 are similar to the above-described business objects 402, 406, and 408, respectively, but business objects 302-306 also include an assigned priority.

Business objects may be designed and stored in database 196 until they are instantiated when called at runtime. Furthermore, database 196 may also store metadata regarding business objects. Metadata may be defined as data about data. Metadata may also include a schema. A schema is an organization or structure, such as the organization of a database or the structure of an object in an object-oriented program, which can be stored in database 196. A schema may be depicted visually as a structure or a formal text-oriented description (e.g., script).

In some embodiments, system 100 may be implemented as part of an enterprise services framework. An enterprise services framework is a client-server architecture that includes services, such as web services. The services are accessible to the enterprise, such as those client systems (and their corresponding users) allowed access to the services through the Internet or an intranet. Although FIG. 1 is described with respect to a client-services framework, system 100 can utilize any other framework instead.

Figure 2:
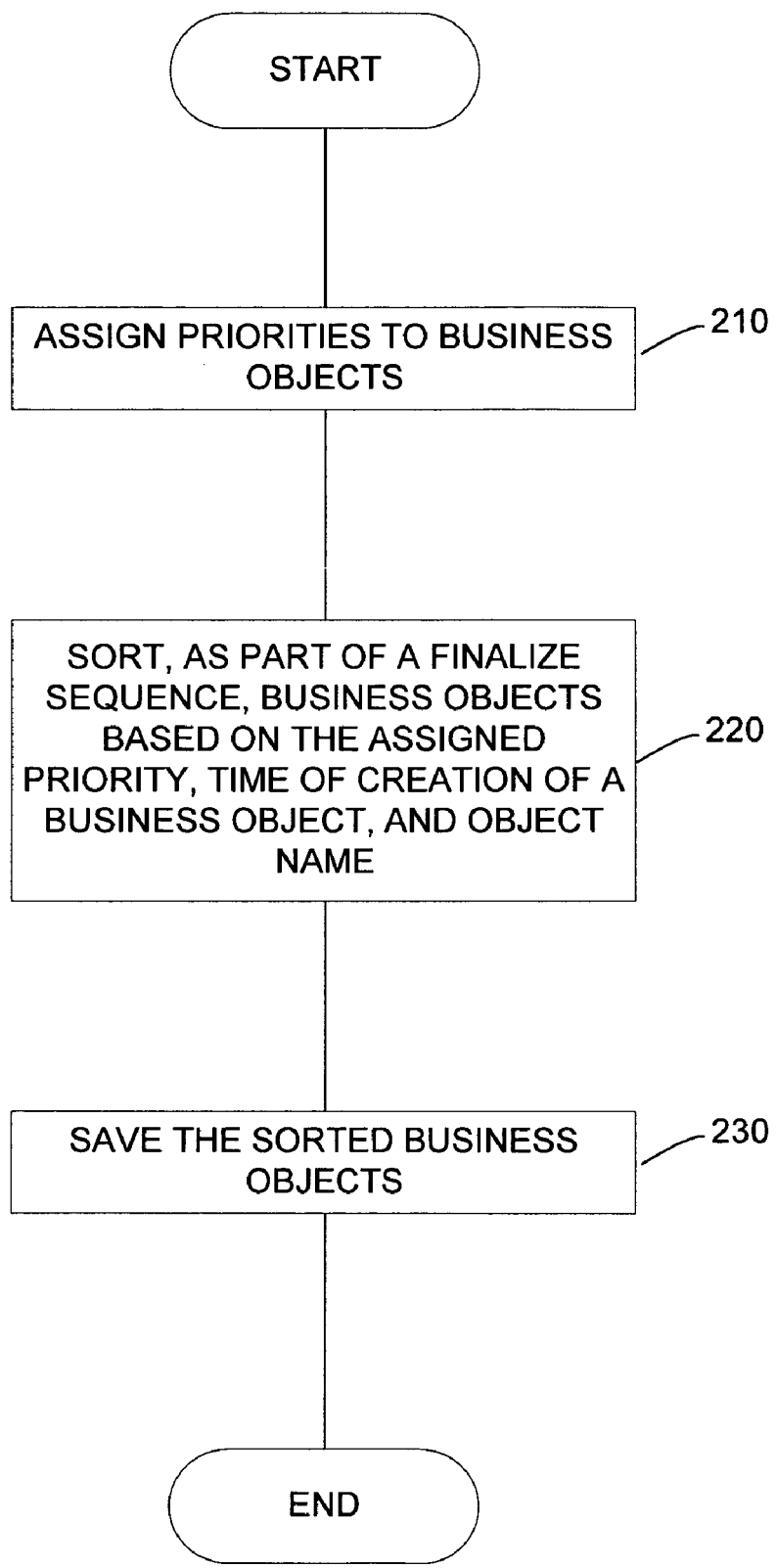
FIG. 2 illustrates a flowchart of a sequence that uses assigned priorities when saving objects to a database to minimize conflicts caused by dependencies from other objects.

FIG. 2 depicts a flowchart of steps associated with implementing a finalize sequence that saves business objects in a sequence determined based on priorities assigned to each business object during the design of the business objects. Referring to FIG. 2, during the design of business objects 302-306, each of the business objects may be assigned a priority (step 210). The business objects 302-306 may then be stored in a repository, such as database 196. For example, service 198 may correspond to a flight reservation system, with business objects 302 corresponding to available flights, business object 304 corresponding to the quantity of available seats on a flight, and business object 306 corresponding to the quantity of seats purchased under a flight under a reservation.

During a finalization sequence, a business object may re-compute some of its data and manipulate data in other business objects as well. Returning to the above example, if business object 302 manipulates (e.g., writes) data in business object 306 and business object 304 manipulates data in business object 306, the business objects would need to be finalized. Returning to the flight reservation example, any change to the quantity of seats available 304 must be written to quantity of seats purchased 306, so that a user cannot purchase more seats than are available. Similarly, the available flight 302 may be changed, for example, from a jumbo jet to a smaller regional jet. In that case, the available flight information 302 must be written to quantity of seats purchased 306, so that a user cannot purchase more seats than are available. In this example, business objects 302-306 are assigned priorities of one 350, two 352, and three 354, respectively.

Although FIG. 1 depicts priorities ranging from one to three, other priorities and ranges may be used. For example, the priority values may range from A to C. Moreover, although the highest priority value is described in this example as having a value of "1" other values may be considered to be the highest priority as well.

When application 112 initiates a transaction with service 198, business objects 302-306 are instantiated to allow execution of the service—in this example, a flight reservation service. At some point during the transaction, data associated with business objects 302-306 should be distributed and thus a finalize sequence initiated to save to database 196 data associated with business objects 302-306. The finalize sequence may limit reading and writing to business objects 302-306 until any information associated with those business objects is saved from runtime buffer 194 to database 196. During the finalize sequence, each of the business objects 302-306 is sorted according to the assigned priority assigned in step 210 (step 220). In the example of FIG. 1, the business objects are sorted based on predetermined priorities 350-354 as follows: business object 302, business object 304, and business object 306.

Next, each of the business objects 302-306 may be saved to database 196 in sequence in accordance with the sorted order (step 230). For example, business object 302 would be finalized and saved first, followed by business object 304, and then business object 306. After the save, the finalize sequence may be terminated allowing service 198 and business objects 302-306 to resume normal operation.

As noted, business object 302 can write to business object 304 and business object 306, while business object 304 can also write to business object 306. As a result of these cross dependencies between business objects, it may be advantageous to distribute their data based on priorities determined before the instantiation of the objects, such as during the design of the objects. The priority scheme may take into account the dependencies between business objects. Specifically, a business object that is dependent on other business objects may be assigned a lower priority. In this example, business object 306, which depends on both objects 302 and 304, has the lowest priority of three 354 (and would thus be finalized and thus saved after business objects 302 and 304).

In some implementations, in addition to the assigned priorities 350-352, other criteria may be used to sort the business objects during step 220. For example, the creation time of a business object may be used, so that a higher priority business object is ranked first (e.g., with a priority of "1" 350) in a sort, then within each priority, the time that a business object is initially created in the repository is used as a secondary criterion. If an older object has the same priority as a newer one, the older object would be finalized first because it is likely that the newer object might depend from the older object.

Additional sort criteria may be used during step 220. Examples of criteria include object name (e.g., a unique identifier for the business object) and software layer (e.g., business objects associated with a core function ("inner layer") would be assigned a higher priority and thus finalized before a customer specific business object ("outer layer")).

In some implementations, the service manager 192 provides change management, as noted above. Change management ensures those services as well as other business objects access data that is accurate. Data is deemed accurate if it is in a current state (or phase). Phase information describes the appropriate state of a business object at any instance of time. Because business object data may be vary over time (e.g., changed, created, deleted, saved, and the like) based on changes imposed by a user at application 112 as well as other business objects, knowledge of phase information may be important to ensure the right data is accessed and used.

When reading or writing to a business object at a service, the business object may be place in a clean state. A clean state may be obtained by performing a flushing function, which executes any previously pending actions (e.g., a write, a create, an update, a delete, save, and so forth) at the service and its corresponding business objects. Once the flushing function is completed, a service or business object can read or write to the service and its corresponding business object and access accurate data (i.e., data in a proper state). Moreover, when a save transaction is triggered at a service and its corresponding business objects, a finalize sequence is initiated, which may include a implementing a "checked" mode. The checked mode means that business objects called by a service have their "before save" completed (e.g., any previously pending saves to the services and its corresponding business objects have been completed). Next, the finalize sequence may include a check before save state. In the check before save state, a service and its corresponding business objects can only be read from, and any before saves should have already been completed (e.g., the service and its corresponding business objects should be in checked mode). In the do save state, the checked-before-save business objects in buffer 194 are then saved into the database 196.

The use of the assigned priority to sort business objects as part of a finalization sequence may offer benefits, such as ease of implementation, reproducibility, and predictability (i.e., understandable to both humans and machines).

The systems and methods disclosed herein may be embodied in various forms including, for example, a data processor, such as a computer that also includes a database, digital electronic circuitry, firmware, software, or in combinations of them. Moreover, the above-noted features and other aspects and principles of the subject matter described herein may be implemented in various environments. Such environments and related applications may be specially constructed for performing the various processes and operations according to the subject matter described herein or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the subject matter described herein, or it may be more convenient to construct a specialized apparatus or system to perform the required methods and techniques.

The systems and methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

It is to be understood that the foregoing description is intended to illustrate and not to limit the scope of the subject matter described herein, which is defined by the scope of the appended claims. Other embodiments are within the scope of the following claims.

What is claimed is:

1. A computer-implemented method comprising:
   instantiating, at a server system comprising one or more programmable processors, a plurality of data objects associated with data stored in a database at a persistent storage, the instantiating providing for execution of a service called by an application;
   storing, in a runtime buffer, the instantiated plurality of data objects and the data associated with the plurality of data objects;
   sorting the plurality of data objects into a finalize sequence based on a priority assigned to each data object of the plurality of data objects during design of the plurality of data objects and prior to the calling of the service by the application, the priority of each data object comprising a dependency-based priority and a secondary criterion for ranking multiple data objects of the plurality of data objects that have a same dependency-based priority, the dependency-based priority comprising an inverse of a number of other data objects that depend upon that data object such that a first data object of the plurality of data objects has a higher dependency-based priority than a second data object of the plurality of data objects if the first data object has fewer other data objects that depend therefrom, the secondary criterion comprising comparing a creation time in the database of two data objects with a same dependency-based priority and ranking an older of the two objects higher than a newer of the two objects, the priority-based sorting determining an order at which the data of each of the plurality of data objects is to be saved from the runtime buffer to the database in the persistent storage; and
   saving the data associated with the plurality of data objects from the runtime buffer to the database in the persistent storage according to the determined order finalize sequence, finalization and saving of each data object completing before finalization and saving of a next data object in the finalize sequence begins.

2. The method of claim 1, further comprising: receiving, at the server from the application, a request to instantiate the plurality of data objects.

3. The method of claim 1, wherein the priority for each data object further comprises: an alpha-numeric value in a range of values.

4. The method of claim 1, wherein sorting further comprises:
   sorting each of the plurality of business objects based on the priority and a time of creation associated the business object.

5. The method of claim 1, wherein the priority for each data object further comprises: a business object name.

6. The method of claim 5, wherein the priority for each data object further comprises: a relative position of the data object in a layered software hierarchy.

7. The method of claim 1, further comprising: limiting reading and writing to data associated with the plurality of data objects and stored in the database until the changes are saved from the runtime buffer to the persistent storage.

8. The method of claim 7, further comprising: terminating the finalize sequence after completion of the saving and allowing the data associated with the plurality of data objects and stored in the database to resume normal operation.

9. The method of claim 1, further comprising placing each data object in a clean state prior to saving the changes, the placing the data object in a clean state comprising performing a flushing function that executes any previously pending actions for the data object.

10. The method of claim 1, wherein the saving is triggered by the service.

11. A computer-readable storage medium containing instructions to configure a processor to perform a method comprising:
    instantiating, at a server system comprising one or more programmable processors, a plurality of data objects associated with data stored in a database at a persistent storage, the instantiating providing for execution of a service called by an application;
    storing, in a runtime buffer, the instantiated plurality of data objects and the data associated with the plurality of data objects;
    sorting the plurality of data objects into a finalize sequence based on a priority assigned to each data object of the plurality of data objects during design of the plurality of data objects and prior to the calling of the service by the application, the priority of each data object comprising a dependency-based priority and a secondary criterion for ranking multiple data objects of the plurality of data objects that have a same dependency-based priority, the dependency-based priority comprising an inverse of a number of other data objects that depend upon that data object such that a first data object of the plurality of data objects has a higher dependency-based priority than a second data object of the plurality of data objects if the first data object has fewer other data objects that depend therefrom, the secondary criterion comprising comparing a creation time in the database of two data objects with a same dependency-based priority and ranking an older of the two objects higher than a newer of the two objects, the priority-based sorting determining an order at which the data of each of the plurality of data objects is to be saved from the runtime buffer to the database in the persistent storage; and saving the data associated with the plurality of data objects from the runtime buffer to the database in the persistent storage according to the determined order finalize sequence, finalization and saving of each data object completing before finalization and saving of a next data object in the finalize sequence begins.

12. The computer-readable storage medium of claim 11, wherein the method further comprises: receiving, at the server from the application, a request to instantiate the plurality of data objects.

13. The computer-readable storage medium of claim 11, wherein the priority for each data object further comprises: an alpha-numeric value in a range of values.

14. The computer-readable storage medium of claim 11, wherein the priority for each data object further comprises: a business object name for the data object.

15. The computer-readable storage medium of claim 14, wherein the priority for each data object further comprises: a relative position of the data object in a layered software hierarchy.

16. A system comprising:
a processor; and
a memory, wherein the processor and the memory are configured to perform a method comprising:
instantiating, at the one or more processors, a plurality of data objects associated with data stored in a database at a persistent storage, the instantiating providing for execution of a service called by an application;

storing, in a runtime buffer, the instantiated plurality of data objects and the data associated with the plurality of data objects;

sorting the plurality of data objects into a finalize sequence based on a priority assigned to each data object of the plurality of data objects during design of the plurality of data objects and prior to the calling of the service by the application, the priority of each data object comprising a dependency-based priority and a secondary criterion for ranking multiple data objects of the plurality of data objects that have a same dependency-based priority, the dependency-based priority comprising an inverse of a number of other data objects that depend upon that data object such that a first data object of the plurality of data objects has a higher dependency-based priority than a second data object of the plurality of data objects if the first data object has fewer other data objects that depend therefrom, the secondary criterion comprising comparing a creation time in the database of two data objects with a same dependency-based priority and ranking an older of the two objects higher than a newer of the two objects, the priority-based sorting determining an order at which the data of each of the plurality of data objects is to be saved from the runtime buffer to the database in the persistent storage; and saving the data associated with the plurality of data objects from the runtime buffer to the database in the persistent storage according to the determined order, finalization and saving of each data object completing before finalization and saving of a next data object in the finalize sequence begins.

17. The system of claim 16, wherein sorting further comprising:
sorting each of the plurality of objects based on the priority, a time of creation, and an object name.

18. The system of claim 16, wherein the priority for each data object further comprises: a relative position of the data object in a layered software hierarchy.

* * * * *